(12) United States Patent
Mocanu et al.

(10) Patent No.: US 10,936,049 B2
(45) Date of Patent: Mar. 2, 2021

(54) PMIC/PMIC INTERFACE FOR DISTRIBUTED MEMORY MANAGEMENT IMPLEMENTATIONS

(71) Applicant: Intel Corporation, Santa Clara, CA (US)

(72) Inventors: Adrian Mocanu, Langley (CA); Andrew Morning-Smith, Vancouver (CA); Zeljko Zupanc, Vancouver (CA); Derrick Wilson, North Vancouver (CA)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 16/396,557

(22) Filed: Apr. 26, 2019

(65) Prior Publication Data

US 2019/0250697 A1 Aug. 15, 2019

(51) Int. Cl.
*G06F 3/06* (2006.01)
*G06F 1/3296* (2019.01)
*G06F 1/3234* (2019.01)

(52) U.S. Cl.
CPC .......... *G06F 1/3296* (2013.01); *G06F 1/3275* (2013.01); *G06F 3/0604* (2013.01); *G06F 3/0659* (2013.01); *G06F 3/0673* (2013.01)

(58) Field of Classification Search
CPC ..... G06F 1/3228; G06F 1/3275; G06F 3/0625
See application file for complete search history.

(56) References Cited

U.S. PATENT DOCUMENTS

| 10,241,551 | B2 | 3/2019 | Girard et al. | |
| 2018/0088658 | A1 | 3/2018 | McFarlane et al. | |
| 2019/0064910 | A1 | 2/2019 | Wang et al. | |
| 2019/0278496 | A1* | 9/2019 | Rowley | G06F 11/349 |
| 2019/0340142 | A1* | 11/2019 | Patel | G11C 5/14 |

OTHER PUBLICATIONS

Extended European Search Report for Patent Application No. 20161762.8, dated Jul. 21, 2020, 6 pages.

* cited by examiner

*Primary Examiner* — Albert Wang
(74) *Attorney, Agent, or Firm* — Compass IP Law PC

(57) ABSTRACT

An apparatus is described. The apparatus includes a power management integrated circuit (PMIC) semiconductor chip having logic circuitry to implement a PMIC/PMIC interface having a downstream signal line and an upstream signal line. The downstream signal line to communicate any of multiple states that a downstream PMIC semiconductor chip is to implement with one of multiple voltage levels, where, different ones of the multiple voltage levels correspond to different ones of the multiple states. The upstream signal line is to communicate whether or not the downstream PMIC semiconductor chip is ready to receive a next one of the multiple voltage levels.

20 Claims, 8 Drawing Sheets

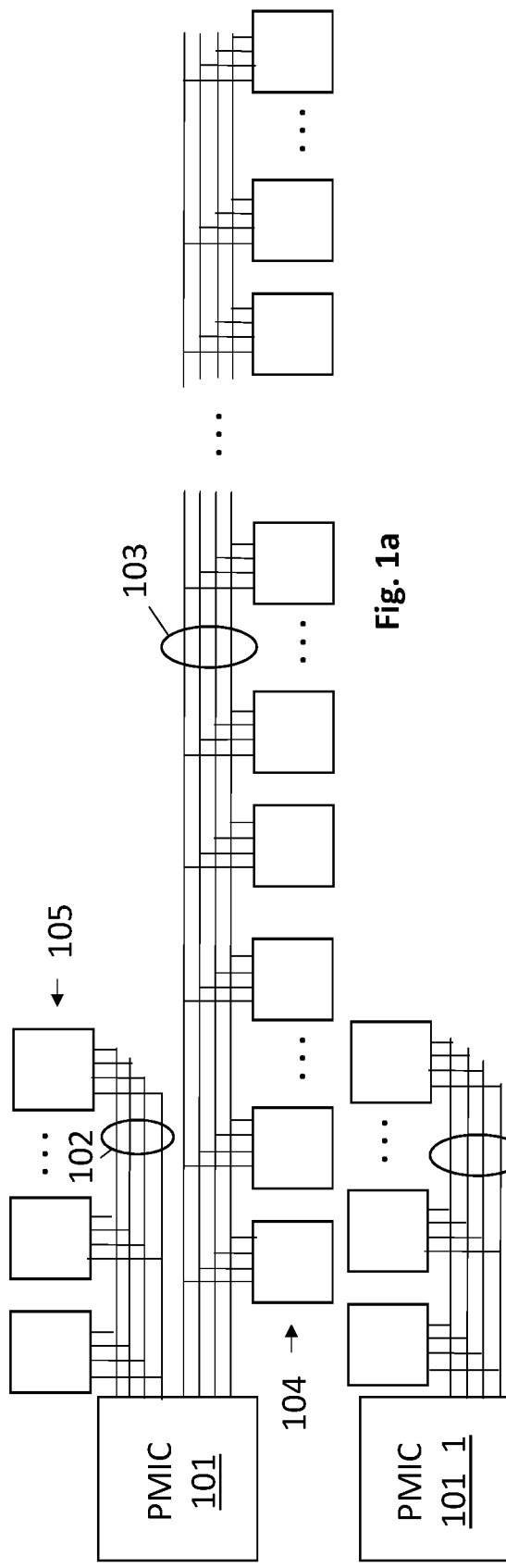
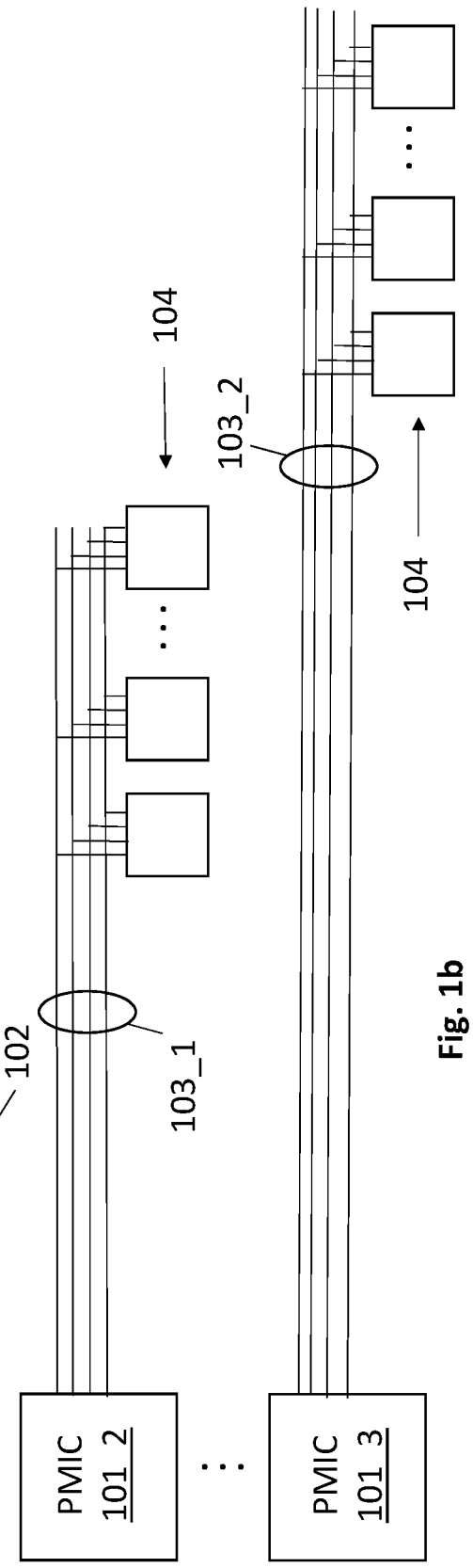

| Pwr. St. | Signal Level Transmitted By Upstream PMIC | Threshold Levels Of Downstream PMIC's Input Comparator |
|---|---|---|
| S3 | >1.2V | 1.0V |
| S2 | 0.8V | 0.6V |
| S1 | 0.4V | 0.2V |
| S0 | 0V | |

Fig. 4

PMIC/PMIC INTERFACE FOR DISTRIBUTED MEMORY MANAGEMENT IMPLEMENTATIONS

FIELD OF INVENTION

The field of invention pertains generally to the electronic arts, and, more specifically, to a PMIC/PMIC interface for distributed memory management implementations.

BACKGROUND

Computing system designers are seeking more advanced capabilities from their system memories and/or storage devices (e.g., solid state drives (SSDs)) in order to keep pace with the increasing demand for data arising from, e.g., artificial intelligence, cloud computing and/or other computing intensive and/or data center focused applications. As such, computing system designers are seeking ways for their main memory, co-processor memory and/or mass storage devices to demonstrate any/all of greater storage capacity, higher bandwidth, new functionality (e.g., non-volatility in the case of a main memory DIMM, "in-memory" computational logic for artificial intelligence applications, etc.).

FIGURES

A better understanding of the present invention can be obtained from the following detailed description in conjunction with the following drawings, in which:

FIG. 1a shows a traditional memory power management implementation;

FIG. 1b shows an emerging memory power management implementation;

FIG. 4 shows signal levels for an exemplary multi-level signal of the PMIC/PMIC interface;

DETAILED DESCRIPTION

Figure 2A:
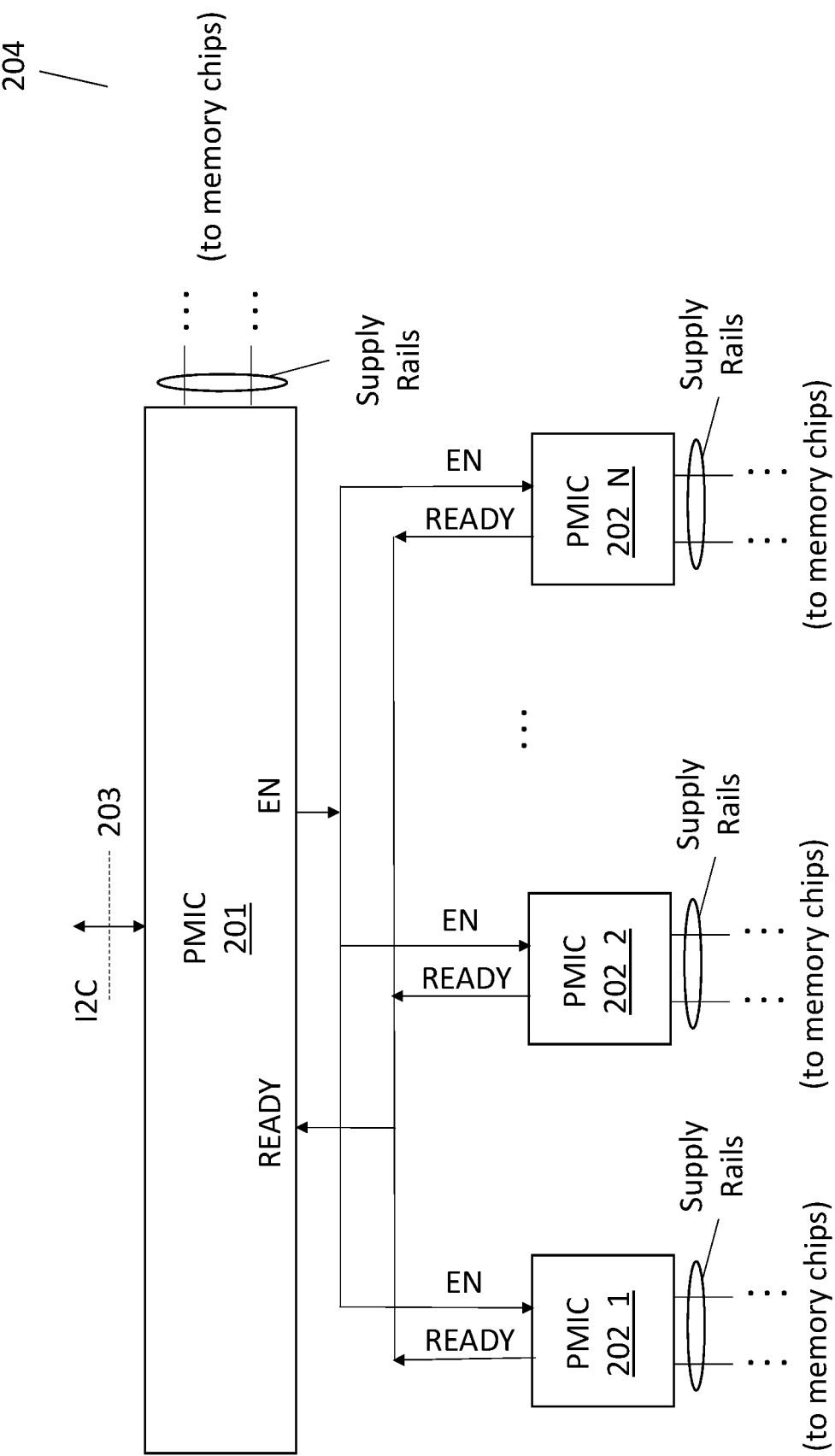
FIGS. 2a, 2b and 2c show embodiments for implementing the emerging memory power management implementation of FIG. 1b.

Typically, computer memories are physically implemented with one or more memory modules that are plugged into a computing system. Non-volatile, dynamic random access memory (DRAM) dual-in line memory modules (DIMMs) have been the standard memory module for many years. However, in order to achieve some/all of the performance improvements described in the background (greater storage capacity, higher bandwidth, new functionality, etc.) newer memory modules are emerging such as non-volatile memory DIMMs, hybrid DRAM and non-volatile memory DIMMs, DIMMS with stacked memory chips, stacked memory modules having a different form factor and/or mechanical shape and/or system interface than a traditional DIMM, etc. Similarly, new SSD designs are attempting to stack more memory chips in a same or smaller form factor device.

Non volatile memory chip innovations include byte addressable non-volatile memory composed, e.g., of an emerging resistive memory cell memory technology such as a phase change random access memory, a dielectric random access memory, a ferroelectric random access memory, spin torque transfer random access memory, etc. Many of these emerging non-volatile memory technologies include three dimensional storage cell arrays (e.g., having a crosspoint access architecture) where storage cells are stacked over one another above the semiconductor chip substrate. Flash memories also construct three dimensional storage cell arrays above the semiconductor substrate. Non-volatile memory manufacturers of both emerging and flash memories are attempting to stack more and more storage cells upon one another in order to increase the storage densities of their respective memory chips.

Any/all of these innovations can result in more power consumption per memory module and/or storage device. Correspondingly, more sophisticated memory/storage power management functions are being devised for the memory implementations of future computer systems.

FIG. 1a shows the power design for a traditional memory module, SSD or group of memory modules/SSDs (such as the memory modules coupled to a same memory channel or memory controller, or, the SSDs coupled to the same PCIe bus or same peripheral control hub). Here, a number of memory chips 104 and supporting memory system components 105 (e.g., SSD processor, "far memory" controller, etc.) are powered from a number of corresponding supply rails 102, 103 provided by a single power management integrated circuit (PMIC) 101.

As is known in the art, PMICs generally have more than one associated voltage regulator, each providing a supply voltage/rail to the system components. For example, as depicted in FIG. 1a, the PMIC is providing two groups of voltage rails (101 and 102) to various components. A supply rail provides the power supply voltage(s) for one or more semiconductor chips and can include more than one physical wire as depicted in FIG. 1a.

By contrast, FIG. 1b shows an emerging "distributed" power supply design in which multiple supply rails 102, 103_1, 103_2 are supplied by multiple PMICs 101_1, 101_2, 101_3. With increased current draw per memory chip and/or memory module, too much current can flow through a single supply rail and/or PMIC if the traditional approach of FIG. 1a is attempted. As such, in the approach of FIG. 1b, multiple supply rails and PMICs are instantiated in order to keep the current draw per supply rail and/or PMIC within manageable limits.

A problem with the distributed approach of FIG. 1b, however, is the interfacing between the host and PMICs when the host attempts to change the power states of the memory system (here, the term "host" includes whatever hardware and/or software and/or firmware intelligence the PMICs take commands from such as a power management function integrated on a system-on-chip (SOC), etc.). Specifically, the host's sending of commands to multiple PMICs can consume too much time and/or consume too many I/Os on the host/PMIC interface. That is, for example, if the host is to serially send power state change commands to each PMIC over a same I2C bus (e.g., each PMIC is connected to the same I2C bus), too much time is consumed serially issuing the commands (e.g., 250 μs per PMIC (e.g., 100 μs to write a command to a PMIC and another 150 μs to perform a PMIC read to confirm the command was successfully received)). By contrast, if the host/PMIC interface consists of a separate I2C bus between the host and each PMIC (i.e., the number of busses equals the number of PMIC chips), then, too many I/Os are active on the host/PMIC interface in order to make power state changes (e.g., each I2C bus must remain active even if the PMICs are in a lowest power state).

Figure 2B:
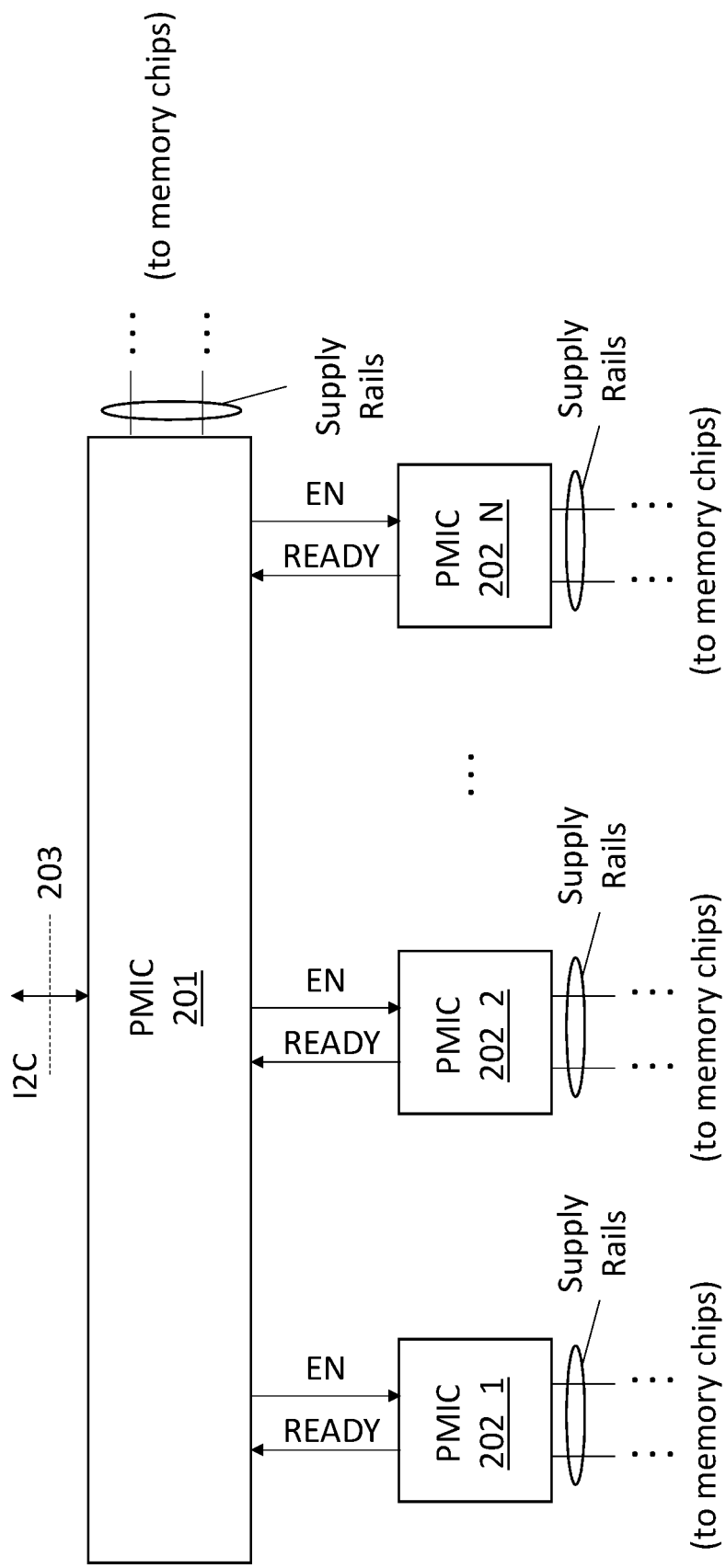
Figure 2C:
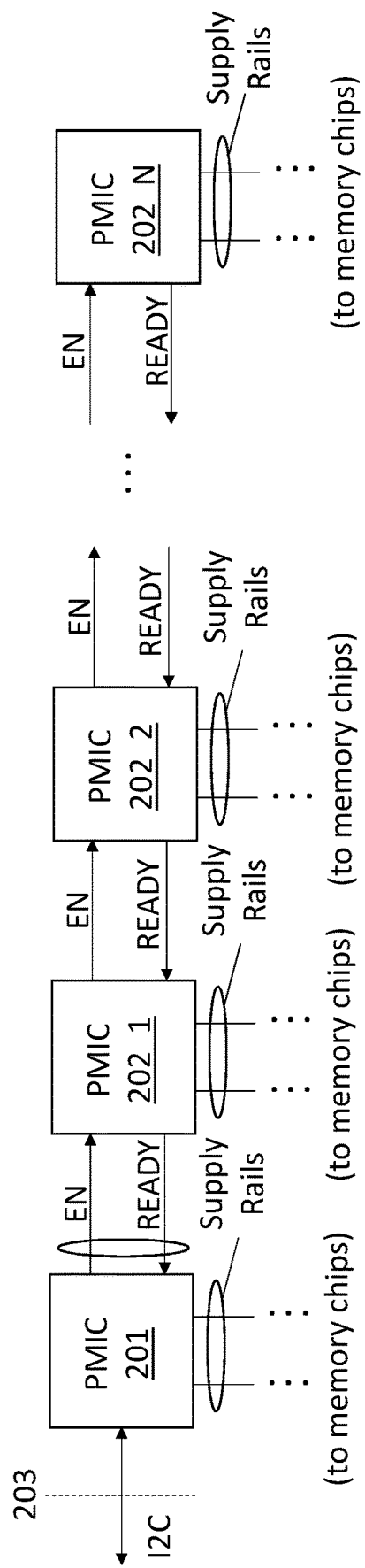

FIGS. 2a, 2b and 2c pertain to a solution that keeps the active I/O count between the host and PMICs tolerable, yet, distributes power state change commands from the host to the PMICs in a timely fashion. As described in more detail below, the solution includes a novel PMIC/PMIC interface so that the PMICs can forward amongst themselves a singularly sent power state change command from the host. FIGS. 2a through 2c pertain to the case of a simplest configuration in which the supply rails from each of the PMICs are to behave the same (e.g., the voltage levels of the rails collectively ramp up/down to according to the same power state changes).

As observed in each of FIGS. 2a, 2b and 2c, the host is coupled to a master PMIC 201 through a single I2C bus. Any single power state change command received from the host by the master PMIC 201 is then forwarded and/or distributed from the master PMICs 201 to each of N slave PMICs 202. Notably, each of the PMICs can have a separate I2C that is used for receiving commands directly from the host when commands other than power state change commands are involved. In the case of power state changes, it is preferable to rely on the new PMIC/PMIC interface instead of respective I2C busses coupled to the PMIC slaves 202 so that these I2C busses can be disabled to save power, and, reduce state transition latency compared to sequencing via I2C.

Additionally, in each of the embodiments of FIGS. 2a, 2b and 2c there exists at least one "two-pin" PMIC/PMIC interface 204. The two-pin PMIC/PMIC interface imposes minimal I/O count complexity on the PMICs given that they are passing host commands amongst themselves. Moreover, as described in more detail further below, at least certain commands, such as power state and/or performance state commands, use a multi-level signaling approach on one of these pins so that the command is transferred from upstream PMIC to downstream PMIC in minimal time.

FIG. 2a shows a master/slave approach in which a master PMIC 201 receives power state change commands from the host through an I2C bus 203 and then forwards these commands to the downstream slave PMICs 202. In the particular embodiment of FIG. 2a, the slave PMICs 202 are coupled to the master PMIC 201 through a bus arrangement of the PMIC/PMIC interface (all of the PMICs are coupled to a same EN signal line and a same READY signal line).

FIG. 2b shows another master/slave approach in which, instead of a bus, the master PMIC 201 is coupled to each slave through a separate "point-to-point" PMIC/PMIC interface. FIG. 2c shows a daisy chain approach in which the master PMIC forwards a power state change command to its immediate downstream PMIC. The downstream PMIC, in turn, forwards the power state change command to is immediate downstream PMIC, etc. until the last PMIC in the chain receives the command.

Getting the command to reach all of the PMICs can take longer with the approach of FIG. 2c as compared to the approaches of FIGS. 2a and 2b because of the propagation delay associated with the command's rippling through the chain of PMICs. By contrast, the "point-to-point" master/slave approach of FIG. 2b, although not having propagation delay issues, adds I/O count complexity to the master PMIC 201. The approach of FIG. 2a, generally has little/no propagation delay issues and keeps PMIC I/O count minimal. However, should the drive strength of the master PMIC 201 be insufficient in some way, or because of some other design challenge, either or both of the approaches of FIGS. 2b and 2c can be used in combination with the approach of FIG. 2a and/or with one another, or separately.

Figure 3:
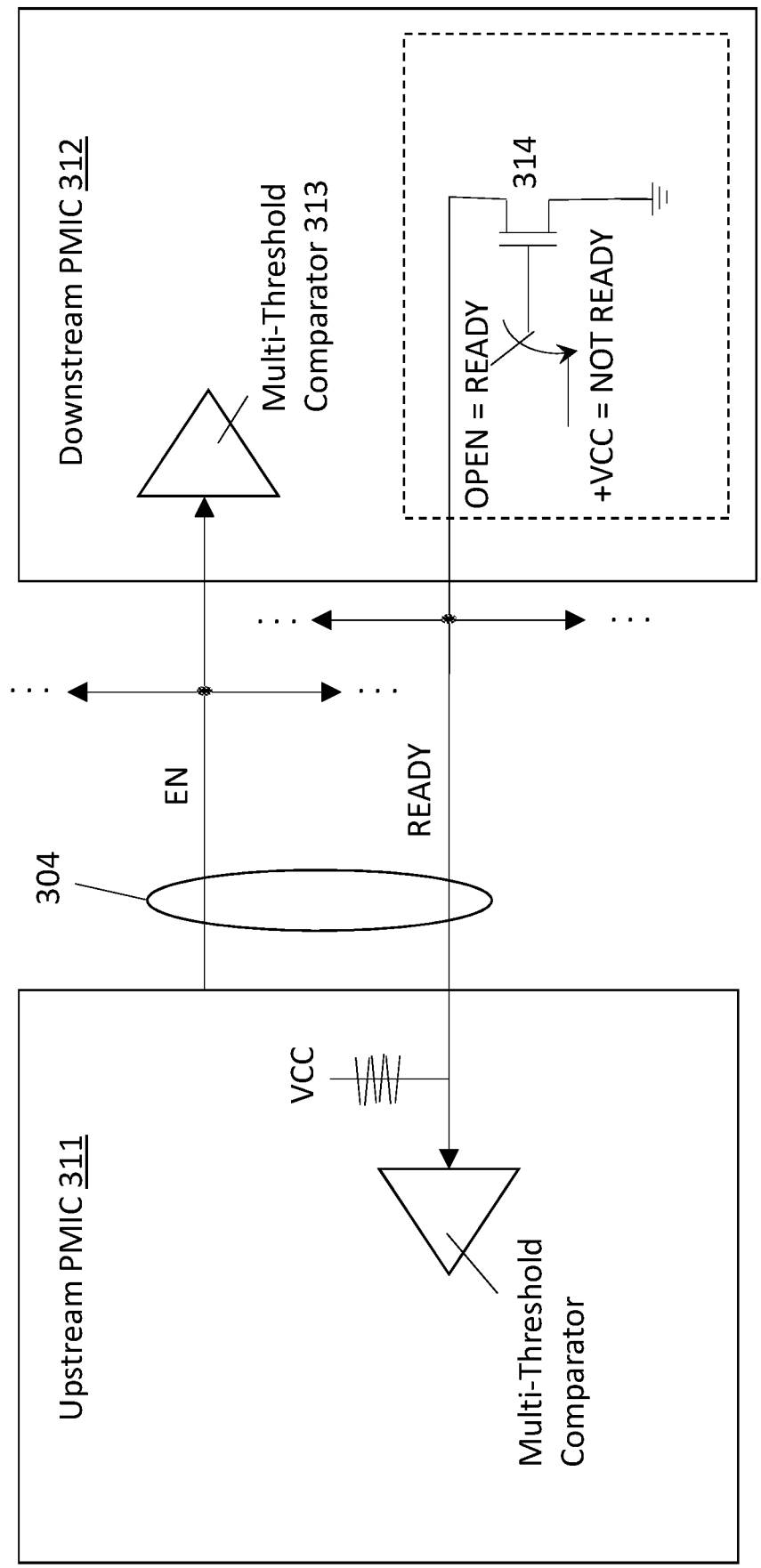
FIG. 3 shows a PMIC/PMIC interface.

FIG. 3 shows a more detailed embodiment of a PMIC/PMIC interface 304. As observed in FIG. 3, the PMIC/PMIC interface includes one downstream signal line (EN) and one upstream signal line (READY). The downstream signal line transports an ENABLE signal from an upstream PMIC 311 to a downstream PMIC 312, whereas, the upstream signal line transports a READY signal from the downstream PMIC 312 back to the upstream PMIC 311.

The ENABLE signal, in various embodiments, is a multi-level signal where each different level corresponds to a different command that, e.g., informs the downstream PMIC what power state it is to be in, what performance state it is to be in, and/or what supply voltage is to be generated. Here, different computing system components can have different power states where, e.g., the S3 state is the only operable state and the S2, S1, etc. power states correspond to increasingly deeper sleep states in which the component consumes less power with each deeper sleep state but also takes longer to return to the active S3 state.

Similarly, in various embodiments, the PMICs may also support a number of performance states P1, P2, . . . PX. According to various embodiments, the PMIC should be in the higher power state in order to place itself in a performance state (because the performance states correspond to a particular functional state and the highest power state is the only operable/functional power state). Each increasing performance state corresponds to a higher level of performance and, correspondingly, power consumption.

For example, the lowest performance state (P1) corresponds to a lowest PMIC performance level (e.g., only one supply rail is activated at a lowest supply voltage), whereas, a highest performance state corresponds (PX) corresponds to a highest PMIC performance level (e.g., all supply rails are activated at a highest supply voltage).

A complication managing multiple PMICs as described above is communicating to the PMICs which of the multiple possible power states and/or performance states they are supposed to be in. The multi-level ENABLE signal accomplishes the goal of being able to communicate a particular one of the multiple possible states both quickly and with only one signal.

FIG. 4 shows an exemplary description of the multi-level signal for communicating power states S3 through S0. Here, if the ENABLE signal is above 1.0 (e.g., ENABLE=1.2V), the downstream PMIC understands that it should be in the S3 (e.g., active state). By contrast, if the ENABLE signal is above 0.6V but is below 1.0V (e.g., ENABLE=0.8V), the downstream PMIC understands that it should be in the S1 state (e.g., first sleep state). Further still, if the ENABLE signal is above 0.2V but is below 0.6V (e.g., ENABLE=0.4V), the downstream PMIC understands that it should be in the S2 state (e.g., second sleep state). Finally, if the ENABLE signal is below 0.2V (e.g., ENABLE=0.0V), the downstream PMIC understands that it should be in the S3 (e.g., deepest sleep state).

Thus, communication of which of four states is to apply is achieved by setting a particular voltage on a single pin. Here, setting the deepest sleep state with the lowest voltage helps the deepest sleep state consume minimal power. The downstream PMIC 312 includes a multi-threshold comparator 313 to determine which of the levels is being transmitted on the ENABLE line.

In combined or alternative embodiments, the different levels of the ENABLE signal can inform a downstream PMIC of which performance state it is to be in (e.g., if it is in a higher or highest power state). In order to achieve this communication, more levels than those depicted in FIG. 4 are needed (if the PMIC is to also have sleep states S2 through S0). As discussed above, the performance states can establish, e.g., how many of the downstream PMIC's supply rails are to be activated, and/or, what particular supply voltage is to be generated at particular supply rail(s) of the downstream PMIC 312. Here, the more discrete levels that the upstream PMIC 311 can reliably set with the ENABLE signal, the more information/commands the downstream PMIC 312 can receive from only the single ENABLE pin (whereas alternate solutions would, e.g., require a separate pin for each power state).

A downstream PMIC 312 communicates whether it is ready to change its power state or performance state, or, more generally, ramp (change) the supply voltage on its supply rails by asserting (=VCC) or de-asserting (=GND) the READY signal. That is, if a downstream PMIC 312 is presently in a state from which it can respond to a command to change its current supply rail setting, the downstream PMIC 312 asserts the READY signal. By contrast, if the downstream PMIC 312 is not presently in a state from which it can respond to a command to change its current supply rail setting (e.g., because it is presently ramping its supply rail to a new voltage), the downstream PMIC 312 will de-assert the READY signal. Thus, by observing the READY signal, the upstream PMIC 311 will understand whether or not the downstream PMIC 312 is in a position to receive a new ENABLE signal that changes the downstream PMIC's current supply rail setting.

As observed in FIG. 3, a downstream PMIC is coupled to the READY signal line with an open drain transistor. Here, the specific embodiment of FIG. 3 corresponds to the approach of FIG. 2a in which multiple slave PMICs are tied to a same READY wire in a bus arrangement. If any downstream PMIC is not ready to receive a next power state change, transistor 314 of that PMIC is turned on which grounds the READY wire. Here, if any of the slave/downstream PMICs are not ready, the turning on of that PMIC's open drain transistor 314 is sufficient to ground the READY wire even if all of the other slave/downstream PMICs are ready. Because the READY signal is not asserted, the upstream PMIC 311 will refrain from sending any new power state change commands (the upstream PMIC will not send a new command until all downstream PMICs tied to the same READY bus are ready). The READY signal is asserted to high (VCC) only if all slave/downstream PMICs are ready, in which case all open drain transistors coupled to the READY wire are off and the READY line is passively pulled to VCC by the pull-up resistor on the upstream PMIC 311.

Figure 5:
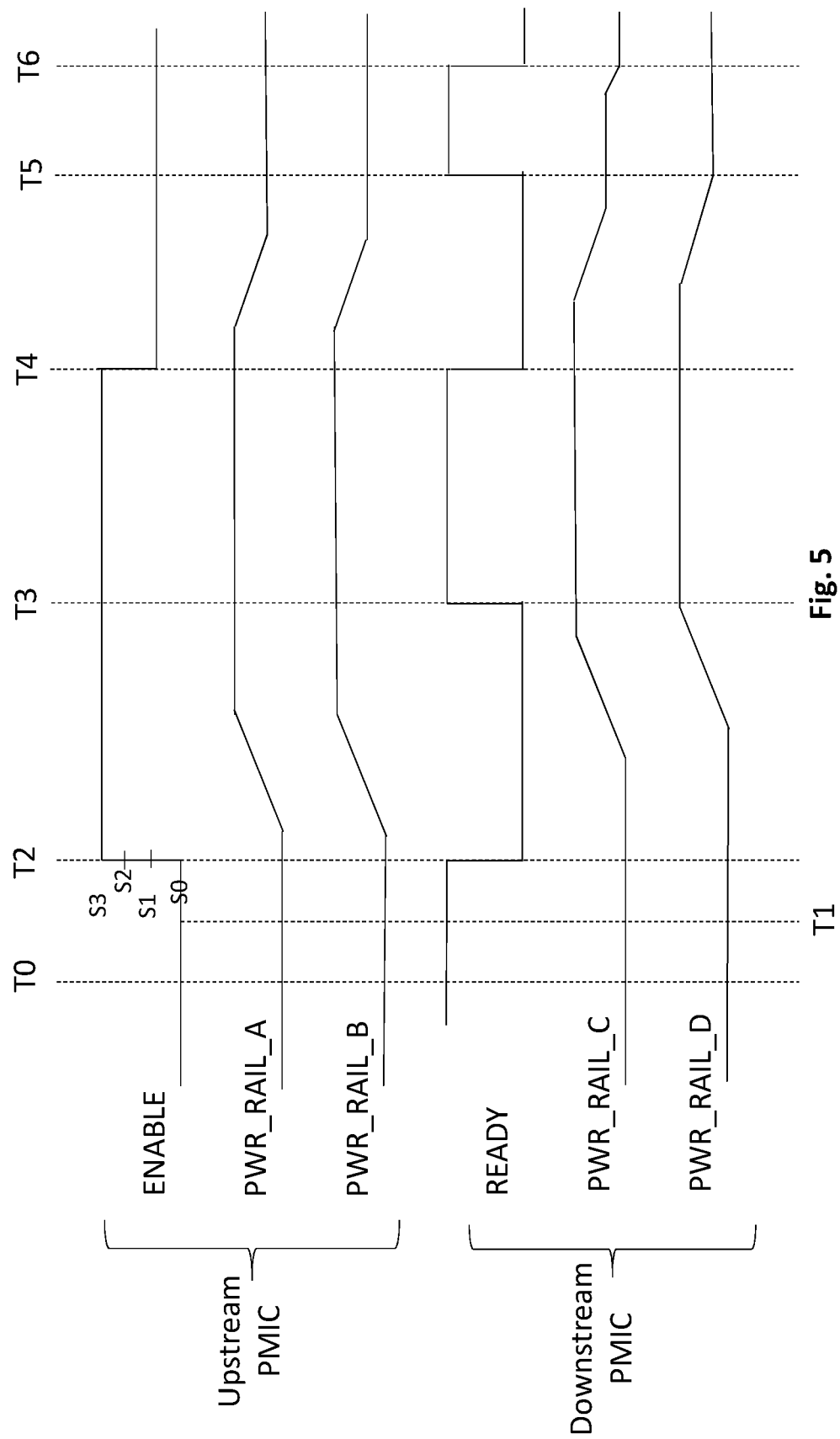
FIG. 5 shows exemplary signaling of the PMIC/PMIC interface.

FIG. 5 shows an example of the communication between upstream and downstream PMICs 311, 312 through the PMIC/PMIC interface. As observed in FIG. 5, the upstream PMIC 311 provides supply rails A and B while the downstream PMIC 312 provides voltage rails C and D. Initially, at time T0, both PMICs are in the S0 (lowest) power state and each of supply rails A-D are off (no supply rail voltage is provided). The downstream PMIC has its READY line asserted to signify that it is ready to receive a command to change its power state from the present S0 state.

At time T1 the upstream PMIC 311 receives a command to enter the highest power state (the S3 state). Here, the upstream PMIC 311 may be the master PMIC and has received this command over, e.g., an I2C bus from the host. Alternatively, the upstream PMIC 311 may be a slave PMIC that is closer to the master PMIC in a daisy-chain arrangement than the downstream PMIC 312 and has received the command from its upstream PMIC.

Regardless, in response to the command, at time T2, the upstream PMIC 311 begins to take steps to ramp its voltage rails A, B and informs the downstream PMIC 312 of the new power state setting by changing the ENABLE line voltage to the level that corresponds to the S3 state. In response to receiving the new ENABLE line voltage level, the downstream PMIC 312 de-asserts the READY signal (because it is processing the newly received command).

After some delay, the downstream PMIC 312 begins ramping supply voltage rails C and D to the S3 voltage setting. Likewise, in response to its earlier receipt of the new power state setting, the supply rails A, B of the upstream PMIC 311 begin ramping up. Here, depending on implementation, the upstream PMIC 312 may purposely impose more delay before ramping its supply voltage rails so that voltage rails A and B complete their ramp at approximately the same time that voltage rails C and D complete their ramp (i.e., an upstream PMIC 311 can delay its ramp to accommodate for any propagation delay or other delay associated with downstream PMIC voltage ramping activity). By so doing, all four supply rails A-D can be approximately synchronized in that they reach the correct supply rail voltage at approximately the same time T3 (or just before in the case of supply rails A, B).

When the downstream PMIC 312 has completed its ramping activity (rails C and D complete their ramp), at time T3, the downstream PMIC 312 asserts the READY signal to signify it is ready to receive a next change in power state setting.

At time T4, the upstream PMIC 311 receives another command to enter the lower power S1 state. As such, in order to communicate this change to the downstream PMIC 312, the upstream PMIC 311 adjusts its EN signal to the S1 level. In response to the command from the upstream PMIC 311, the downstream PMIC de-asserts its READY signal. By time T5 both the upstream PMIC 311 and downstream PMICs have approximately ramped down their respective supply rails, in a synchronized fashion, to a supply voltage that corresponds to the S1 level. The downstream PMIC 312 also signifies that it is ready to receive a next command by asserting the READY signal.

At time T6 the downstream PMIC 312 experiences a problem in that supply rail C suddenly drops to an S0 state voltage level even though a command to do so was never received. In order to communicate that it is experiencing a problem, the downstream PMIC 312 de-asserts the READY signal. Here, the upstream PMIC 311 will recognize that the downstream PMIC is experiencing a problem because the READY signal has toggled from being READY to not being ready while the upstream PMIC 311 has not sent the downstream PMIC any new commands (the ENABLE signal remains at the S1 level).

Thus, the READY signal may not only be used to signal that a command has been successfully received and executed, but also, that an error is being experienced by the downstream PMIC. In response to the problem, if it is not the master, the upstream PMIC may also de-assert its READY signal to report the error further upstream. When the master PMIC becomes aware of the error it can interrupt the host system to make it aware of the problem. The host can then investigate (e.g., by snooping the register space of the PMICs through a sideband control channel).

The above described examples have been written consistently with PMIC devices that have on-board integrated voltage regulation and/or other power supply generation circuitry such that the supply rail voltages are directly emitted by the PMICs. Such PMICs may nevertheless rely on external components to generate their respective supply rail voltages (e.g., switching transistors to implement a pulse width modulated signal). Other PMICs may rely on external voltage regulators and/or other power supply generation circuitry to generate the supply rail voltages. The term PMIC device is understood to mean any of these PMIC devices.

A PMIC semiconductor chip is a semiconductor chip of a PMIC device that includes logic circuitry to carry out any embodiments of the PMIC/PMIC handshaking protocol described above. As such, a PMIC device generally includes a semiconductor chip composed of logic circuitry. Logic circuitry can be hardwired application specific logic circuitry, programmable logic circuitry (e.g., field programmable gate array (FPGA) circuitry), circuitry designed to execute some form of program code (e.g., embedded microcontroller or micro-processor (both of which are a type of processor)) or combinations thereof. PMIC devices and/or a PMIC semiconductor chip may also include analog and/or mixed signal circuitry (e.g., to implement power distribution and/or generation functions). PMIC semiconductor chips designed to act as a master will also include logic circuitry to perform master functions of the master/slave PMIC/PMIC relationship (e.g., receiving commands from a host and forwarding them to one or more downstream PMIC semiconductor chips via the PMIC/PMIC interface, reporting an error to the host, etc.).

Figure 6:
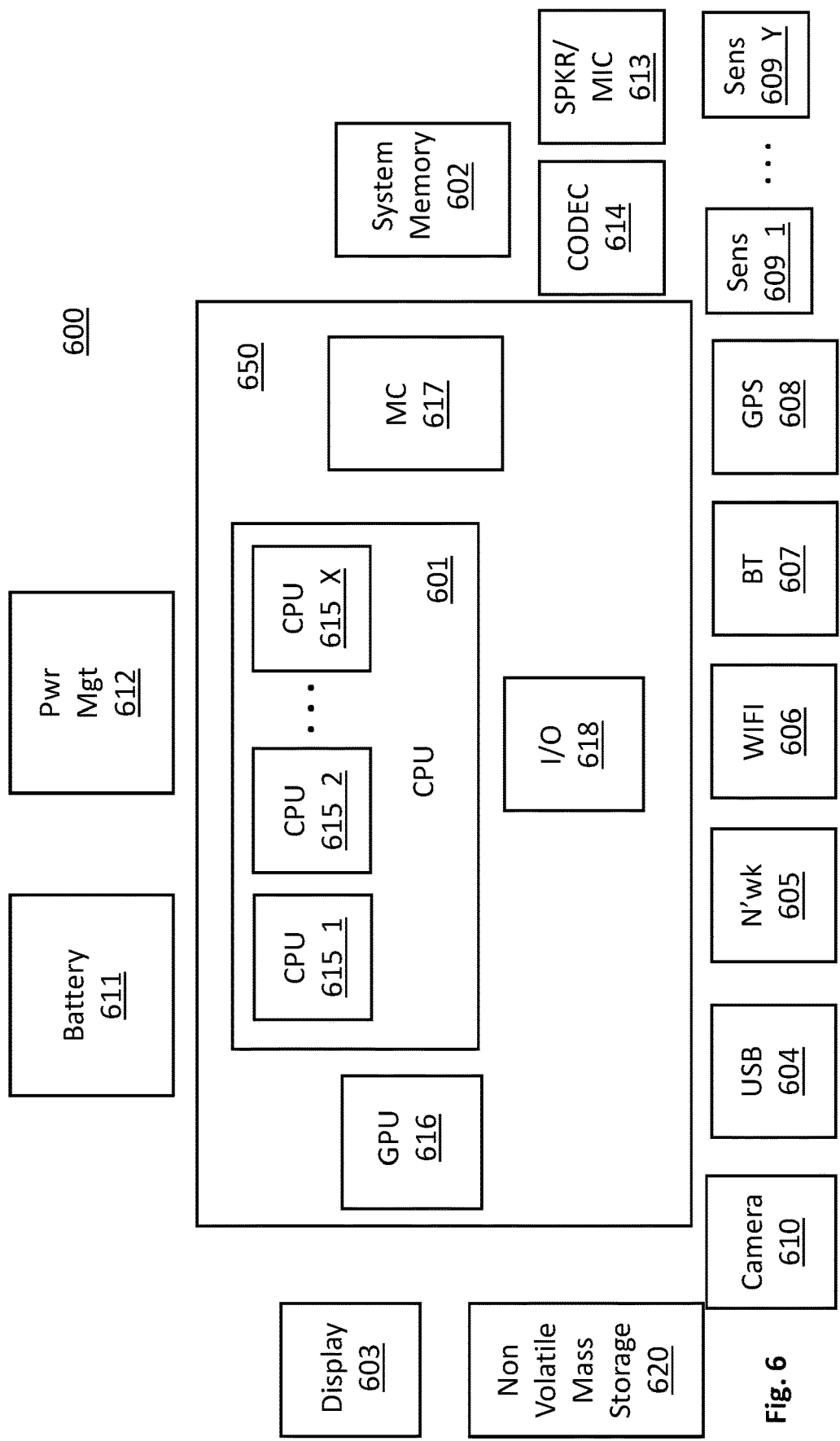
FIG. 6 shows an embodiment of a computing system.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602 (also referred to as "main memory"), a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602. The power management control unit 612 generally controls the power consumption of the system 600.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The computing system also includes non-volatile storage 620 which may be the mass storage component of the system.

The main memory 602 (e.g., implemented with memory modules), other type of memory (such as the local memory of a co-processor such as GPU 616) and/or non volatile mass storage 620 (e.g., implemented with SSDs) may rely on a distributed PMIC arrangement as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components. For example a machine readable storage medium may be used to store drawings of components described herein, and/or, of automated socket assembly/manufacturing processes described herein.

Therefore elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a power management integrated circuit (PMIC) semiconductor chip comprising logic circuitry to implement a PMIC/PMIC interface comprising a downstream signal line and an upstream signal line, the downstream signal line to communicate any of multiple states that a downstream PMIC semiconductor chip is to implement with one of multiple voltage levels, where, different ones of the multiple voltage levels correspond to different ones of the multiple states, the upstream signal line to communicate whether or not the downstream PMIC semiconductor chip is ready to receive a next one of the multiple voltage levels.

2. The apparatus of claim 1 wherein the multiple states comprise power states.

3. The apparatus of claim 2 wherein the multiple states also comprise performance states.

4. The apparatus of claim 1 wherein the multiple states comprise performance states.

5. The apparatus of claim 1 wherein at least some of the multiple states correspond to different power supply rail voltages that the downstream PMIC semiconductor chip is to implement.

6. The apparatus of claim 1 wherein the PMIC semiconductor chip comprises a resistor coupled to an input to receive the downstream PMIC semiconductor chip's open drain upstream signal.

7. The apparatus of claim 1 wherein the PMIC semiconductor chip comprises a host interface and has logic circuitry to act as a master of a distributed PMIC device power supply rail implementation.

8. The apparatus of claim 1 wherein the PMIC semiconductor chip is a component of any of:
   a memory module;
   a solid state drive.

9. The apparatus of claim 1 wherein the PMIC semiconductor chip is a component of a memory module and the memory module meets any of the following:
   the memory module is a dual in-line memory module;
   the memory module comprises stacked memory chips.

10. The apparatus of claim 9 wherein the memory module comprises byte addressable non volatile random access memory chips.

11. A computing system, comprising:
   one or more processing cores;
   a system memory;
   a system memory controller between the system memory and the processing cores;
   a graphics processing unit;
   a solid state drive;
   a distributed supply rail generation circuit within at least one of the system memory and the solid state drive, the distributed supply rail generation circuit comprising multiple power management integrated circuit (PMIC) semiconductor chips, wherein, two or more of the PMIC semiconductor chips comprise logic circuitry to implement a PMIC/PMIC interface comprising a downstream signal line and an upstream signal line, the downstream signal line to communicate any of multiple states that a downstream one of the PMIC semiconductor chips is to implement with one of multiple voltage levels, where, different ones of the multiple voltage levels correspond to different ones of the multiple states, the upstream signal line to communicate whether or not the downstream one of the PMIC semiconductor chips is ready to receive a next one of the multiple voltage levels.

12. The computing system of claim 11 wherein the multiple states comprise power states.

13. The computing system of claim 11 wherein the multiple states comprise performance states.

14. The computing system of claim 11 wherein at least some of the multiple states correspond to different power supply rail voltages that the downstream one of the PMIC semiconductor chips is to implement.

15. The computing system of claim 11 wherein the distributed supply rail generation circuit includes a daisy chain of multiple ones of the PMIC semiconductor chips.

16. The computing system claim 11 wherein the distributed supply rail generation circuit includes multiple downstream PMIC semiconductor chips that fan out from a same upstream PMIC semiconductor chip.

17. A method, comprising:
   an upstream PMIC semiconductor chip sending a first signal on a first signal line to a downstream PMIC semiconductor chip, the first signal to communicate a state that the downstream PMIC semiconductor chip is to implement, the state identified with one of multiple voltage levels, where, each of the multiple levels correspond to a different state that the downstream PMIC is to implement; and,
   the upstream PMIC semiconductor chip receiving a second signal from the downstream PMIC semiconductor chip on a second signal line, the second signal indicating whether or not the downstream PMIC semiconductor chip is ready to receive a next voltage level on the first signal line.

18. The method of claim 17 wherein the upstream and downstream PMIC semiconductor chips are components of a system memory or solid state drive.

19. The method of claim 17 wherein the downstream PMIC semiconductor chip's implementation of the state results in a change in a supply rail voltage generated by the downstream PMIC semiconductor chip.

20. The method of claim 17 further comprising the upstream PMIC receiving a third signal on the second signal line that indicates the downstream PMIC is experiencing an error.

* * * * *